United States Patent

Altschuler

[11] 4,052,857
[45] Oct. 11, 1977

[54] GEOTHERMAL ENERGY FROM SALT FORMATIONS

[75] Inventor: Sidney J. Altschuler, Midland, Mich.

[73] Assignee: The Dow Chemical Company, Midland, Mich.

[21] Appl. No.: 730,050

[22] Filed: Oct. 6, 1976

[51] Int. Cl.² ............................................. F03G 7/04
[52] U.S. Cl. ................................... 60/641; 165/45; 166/302
[58] Field of Search .............. 60/641; 165/45; 166/57, 166/302, 303; 299/5, 6

[56] References Cited

U.S. PATENT DOCUMENTS

| | | | |
|---|---|---|---|
| 3,274,769 | 5/1964 | Reynolds | 165/45 |
| 3,911,683 | 10/1975 | Wolf | 60/641 |

*Primary Examiner*—Allen M. Ostrager
*Assistant Examiner*—Stephen F. Husar
*Attorney, Agent, or Firm*—Daniel L. DeJoseph; C. Kenneth Bjork

[57] ABSTRACT

A method of obtaining geothermal energy from salt formations in which a well is drilled and cased into a suitable salt formation to a depth where the temperature is such that the salt behaves plastically. A weighted, closed end pipe is inserted into the well with its lower, closed end at about the bottom of the salt formation and thereafter an insulated open end pipe is inserted, after the weight has been removed from the closed end pipe, within said closed end pipe, thus forming a double pipe heat exchanger. A heat exchange fluid is circulated, usually in a closed loop, through the double pipe heat exchanger, an energy extracting means, such as, for example, a steam generator or an hydraulic turbine, and back through the heat exchanger.

6 Claims, 7 Drawing Figures

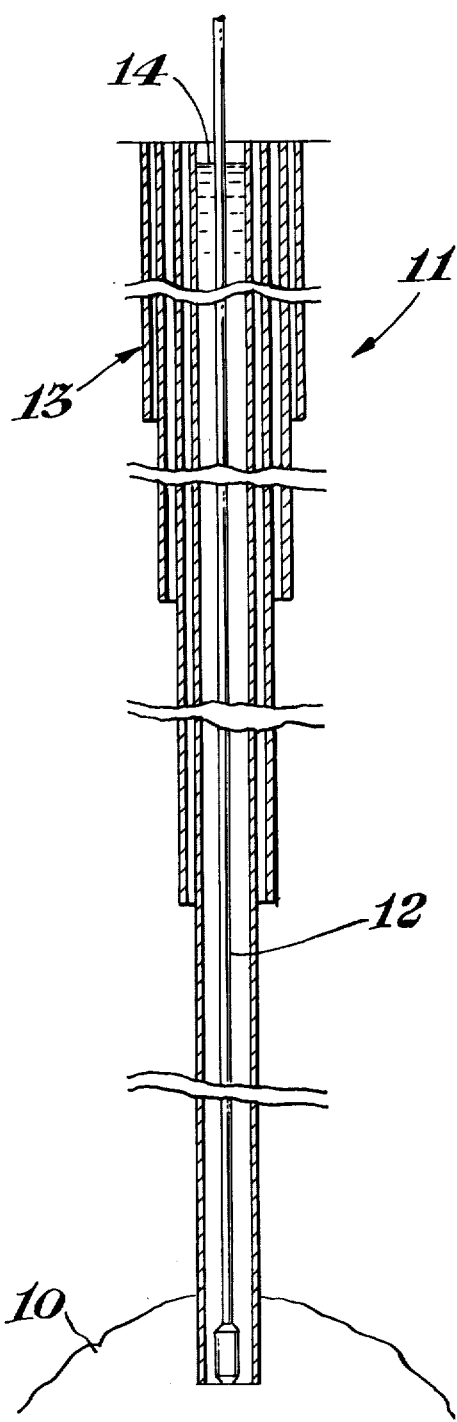
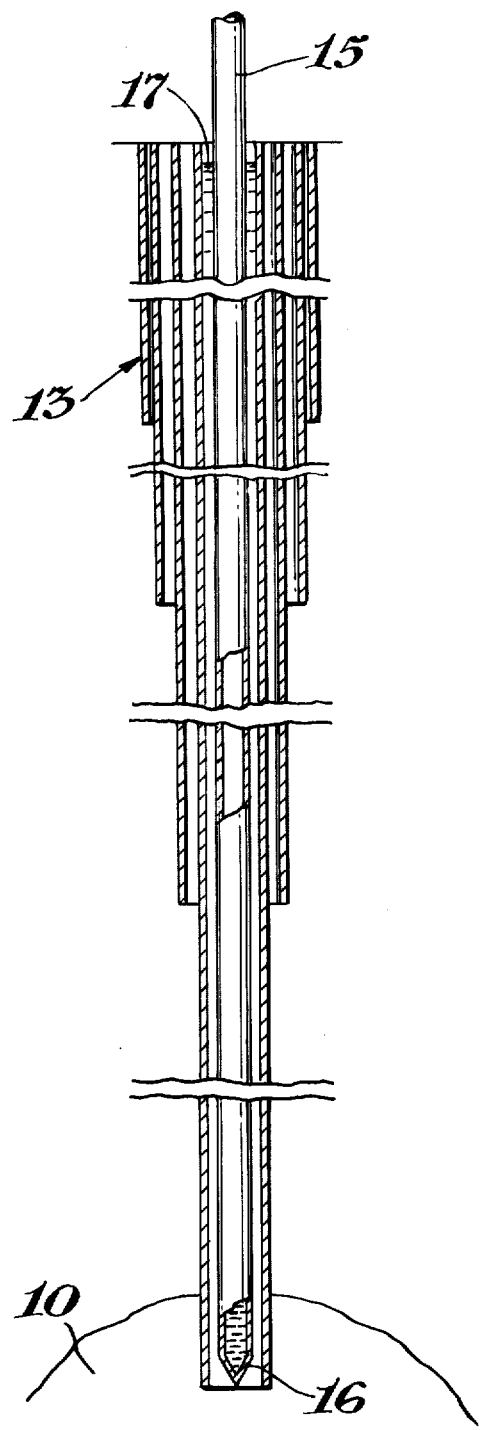

GEOTHERMAL ENERGY FROM SALT FORMATIONS

BACKGROUND OF THE PRESENT INVENTION

With the increasing demand for electrical energy there has been a correspondingly increased interest in methods of producing such energy by geothermal means through the utilization of the natural heat of the earth's interior. Numerous geothermal energy recovery processes have been put forward. These processes all face the problem of obtaining a sufficient amount of heat at a temperature high enough (i.e. a minimum of about 350° F) for process steam or electrical power production. This necessitates the search for anomolous geological formations which have both relatively high temperatures close to the surface and a sufficient reservoir of fluid to make development worth while.

Geyser basins, which provide "dry" steam, are very rare. Furthermore, such "dry" stream methods are not easily adaptable to being operated intermittantly. Certain natural geothermal fluids, such as hot water, are much more abundant but pose corrosion or plugging problems, because of solids dissolved therein, to equipment. Other geothermal methods propose utilizing geopressured water which is located, with much difficulty, at greater depths. Because of the net withdrawal of fluids, all three of these methods are, like oil and gas, depleting resources. In addition, these methods pose environmental problems associated with the release of noxious gases into the atmosphere, the disposal of large amounts of precipitated solids, and the possibility of earth subsidence or earthquakes due to the withdrawal of subterranean fluids.

The Los Alamos Scientific Laboratory's (Energy Research and Development Administration) hot rock process requires drilling relatively deep (i.e., about 10,000 to 15,000 feet) wells into hot, hard rock (such as granite rather than sedimentary rock) and the continued cracking of that rock by cold working fluid to provide enough fresh hot surface for economical heat transfer. This process has the advantage of providing its own fluid in a closed system. However, if further cracking of the hot rock cannot take place, heat transfer will be limited by the slow rate of conduction and, therefore, the life of such a well, and the cost of the energy obtained therefrom, will be difficult to estimate.

In recent years there has been interest in the uses that could be made from the geothermal heat that is found in certain geological formations such as spires or diapirs or "domes" of crystalline rock salt. These domes, which are found in numerous places throughout the world, including the Gulf Coast of the United States and Mexico are, in many instances, found at a reasonable depth within reach of conventional drilling equipment.

One such method of using the heat energy of rock salt domes is taught in U.S. Pat. No. 3,676,078. This method teaches dissolving a cavity within the depths of a salt dome, transferring heat to a heat exchange fluid in the cavity, removing the heat exchange fluid from the cavity, recovering the heat energy contained therein and recirculating the heat exchange fluid back into the cavity. This method has several drawbacks. First, because of the relatively high temperatures that exist at the depths to which U.S. Pat. No. 3,676,078 teaches to excavate, the rock salt will behave plastically. At these depths, unless a counter-pressure is maintained, the normal pressure due to the weight of salt and its overburden is sufficient to cause the plastic salt to flow and to thereby close the cavity. Furthermore, this method limits the choice of heat exchange fluid, in that such fluid will come in direct contact with the salt and it is therefore desirable that the rock salt be insoluble in the fluid. In addition, the above method requires mining, for each salt dome cavity in operation, relatively large amounts of salt. From an economical and operational standpoint, it is questioned whether such an extensive excavation is prohibitively large when compared to the amount of heat energy recovered by this method.

One advantage of the present invention is that it provides for a practical geothermal energy recovery process that is characterized by the knowledge of where to drill, since the geology of salt domes has been extensively researched, and the ability to calculate how long a given heat output can be maintained from a given salt formation.

Another advantage of the present invention is that it provides for a geothermal energy recovery process in which the primary fluid used in the process is self-contained and is not exposed to the underground environment, thereby effectively eliminating the danger of having dissolved solids corrode the mechanisms and conduits employed or precipitate out therein.

A further advantage of this invention is that, because it is dependent upon conduction heat transfer, it can be operated intermitantly. Such intermittant operation will allow the geothermal energy derived therefrom to be used to provide peaking power and thus make economically justifiable the installation of oversized equipment (i.e., a turbine, generator and condensor) while new wells are still being added to the geothermal power plant.

BRIEF DESCRIPTION OF THE PRESENT INVENTION

These and other advantages as will become apparent from the following specification and appended claims are achieved, according to the present invention, by drilling and casing a well in to a suitable salt formation to a depth where the salt temperature is such that the salt is in a plastic state. A first pipe weighted with removable weights and having a closed, preferably pointed, end is sunk, by virtue of either its weight or an external force applied to it or both in appropriate combination, into the plastic salt, ordinarily to the bottom of the salt diapir or until the energy obtained by the well is optimized. The excess weight is removed and a second, open ended, insulated pipe is inserted within the first pipe, thus providing a double pipe heat exchanger. During operation, energy is extracted from the salt by passing a heat exchange fluid through the geothermal well, either down the annulus between the first and second pipes, and back up through the interior of the second insulated pipe (countercurrent flow) or in the reverse direction (cocurrent flow). The heat exchange fluid is passed through an energy extracting means and some of the heat exchange fluid's energy is recovered as heat or kinetic energy.

This invention utilizes two unique properties of rock salt: its relatively high thermal conductivity compared to almost all rock and its plasticity, the onset of which occurs at temperatures well below its melting point, i.e., from about 200° to about 350° C, which are expected to be found at depths of about 10,000 to about 15,000 feet.

The thermal conductivity coefficient of rock salt formations is, for the most part, several times higher than the coefficients of sedimentary rock structures that overlie them. Thus, a salt dome will be an efficient conduit through which heat will pass from deep within the earth's crust and an anomaly which will be hotter than its surroundings at equal depths at least near its top. It is well within the capacity of modern bore hole drilling techniques to reach those depths where the rock salt begins to exhibit plastic behavior.

BRIEF DESCRIPTION OF THE DRAWINGS

FIGS. 1–5 are vertical geologic sectional views which sequentially depict one embodiment of the present invention's method of inserting a double pipe heat exchanger into a salt dome.

DETAILED DESCRIPTION OF THE INVENTION

Figure 3:
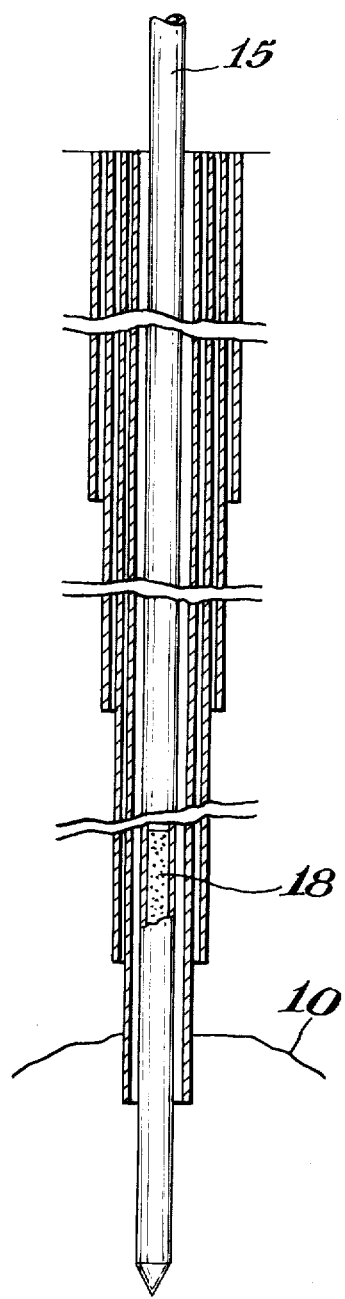

In accordance with the present invention, a geological phenomenon known as a salt "diapir," "dome" or "spire," as indicated by 10 in FIG. 1, that conforms to the general characteristics hereafter discussed, is located. A well 11 is then drilled and cased into the salt dome to a depth at which the salt begins to exhibit plastic behavior. The well 11 at this point in time will be generally in accordance with FIG. 1, which depicts drilling means 12 and casing 13. Optionally, while being drilled and cased, well 11 is filled with drilling fluid 14.

The drilling means 12 is then withdrawn from the cased well and a pipe (indicated by 15 in FIG. 2) with a closed end is inserted, closed end first, into well 11. In a preferred embodiment of the present invention, the closed end of pipe 15 will be pointed, said pointed end being depicted by 16.

If the well is filled with drilling fluid 14, the pipe 15 will displace much of the drilling fluid 14, which could be collected in a so-called "mud" basin (not shown) or a similar receptacle. The drilling fluid remaining within the well 11 will fill the space between the outer surface of pipe 15 and casing 13, and will thus serve as lubricating layer 17.

As depicted in FIG. 3, the pipe 15 is then weighted with heavy shot 18 or a similar weighted material such as, for example, uranium dioxide pellets, to provide a density greater than that of plastic salt. The weighted pipe sinks into the plastic salt of dome 10. If a sufficient amount of weighted materials having a density greater than that of plastic salt is inserted into pipe 15, the pipe will sink of its own accord into said salt. It is understood, however, that weighted material with a density less than plastic salt can be inserted into pipe 15 if the individual practitioner desires only to decrease the amount of external force that must be applied to pipe 15 to sink it in the plastic salt. It is also understood that the weighted material does not necessarily have to be a solid. For instance, heavy brine can be a suitable weighted material.

The rate at which pipe 15 is sunk into the plastic salt will depend upon the needs of the individual practioner of this invention. It it well known that the viscosity of liquids decreases strongly with increasing temperatures as does the "effective viscosity" of the plastic salt. By heating or cooling the layer of salt immediately adjacent to pipe 15 as it is sunk, it should be possible to increase or decrease, respectively, the rate of sinking. A means of achieving this heating or cooling is to use, as a heat transfer medium, the fluid discussed below which is already in the pipe to prevent its possible collapse from internal pressure. However, other possible embodiments are not to be excluded as being beyond the scope of the present invention.

Alternatively, a given sinking rate could be maintained and the combination of weight and/or external force required would be decreased or increased, respectively. By causing different salt temperatures on different portions of pipe 15's perimeter, it should also be possible to control its lateral direction thus causing placement of the well so that more efficient use can be made of the salt formation.

It should be noted that although one needs to only change the temperature of the thin sheath of salt surrounding the pipe, melting this sheath is not beyond the scope of the present invention.

Figure 4:
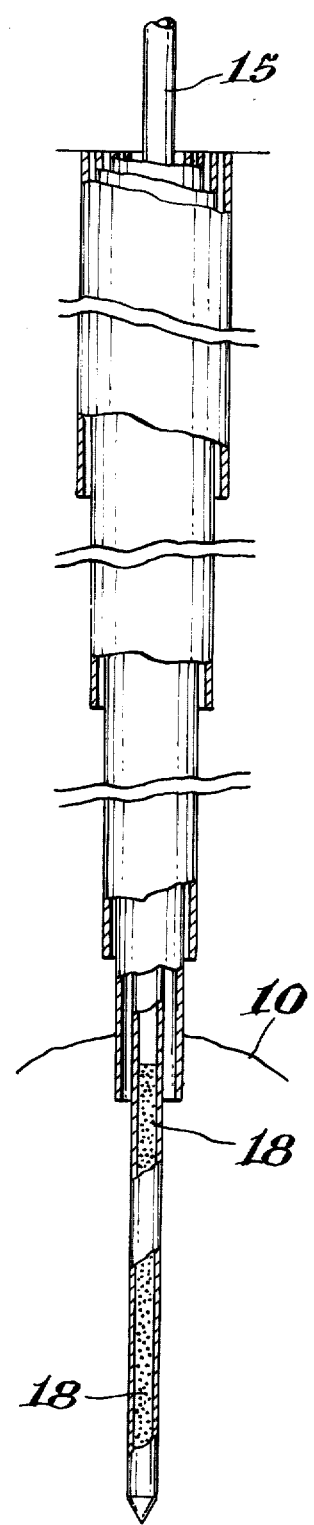

FIG. 4 depicts pipe 15 after it has reached the bottom of the dome 10 or a predetermined depth where the temperature reached and the lateral surface area of the well are calculated or deemed sufficient to maintain the geothermal heat energy system further depicted herein.

After pipe 15 has reached a predetermined depth in dome 10 the shot 18 can be withdrawn from pipe 15 by any of a number of ways that are known to those skilled in the art. For example, a bucket whose bottom can be remotely opened and closed, known otherwise as a Dart Valve Bucket Bailer, can be employed. It is understood, however, that, dependent upon the particular weighted material used, the weighted material may not have to be withdrawn, or only a portion need be withdrawn, from the pipe. For example, heavy brine may be left in the pipe since it may be suitable for use as the primary fluid discussed below.

Figure 5:
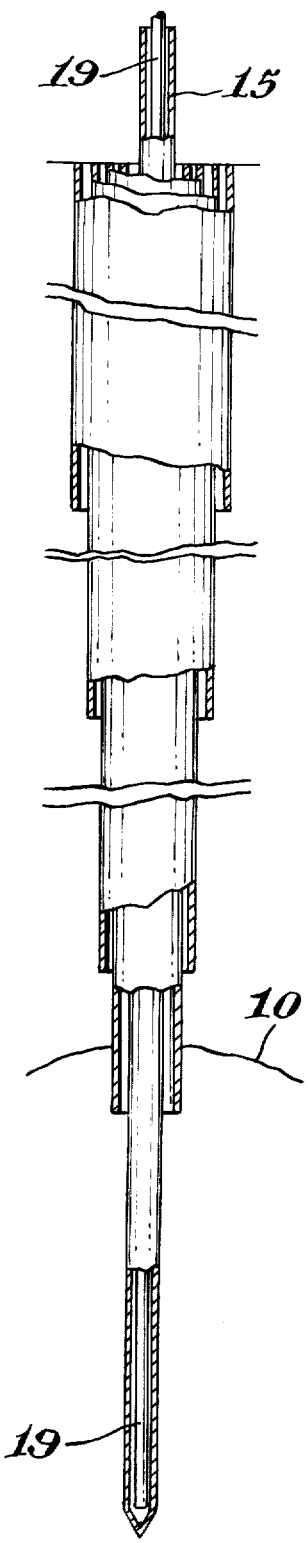

After the shot 18 has been withdrawn from the pipe 15, an inner pipe, depicted in FIG. 5 as 19, preferably insulated and being open at both ends, is inserted within pipe 15, thus providing in combination a long double pipe heat exchanger.

A consideration pertaining to the insertion of the pipe into a salt formation is that the salt and overburden will cause a pressure of about 1.0 psi for each foot of depth. This may tend, at great depths, to collapse the pipe. Such a collapse can be prevented by increasing the wall thickness of the pipe. Another solution is to fill the pipe with a liquid, such as heavy brine, whose density is as close as possible to that of salt (2.3 gm/cm$^3$). However, even water could be used, in that it would enable a pipe which would have collapsed at about 15,000 feet to reach depths of about 25,000 feet. Such liquids can be removed from the pipe by methods readily apparent to those skilled in the art.

One skilled in the art can readily appreciate that there can be certain modifications from the sequential order depicted in FIGS. 1–5 and discussed above. Moreover, certain refinements can be made thereto which are well within the scope of the present invention. Likewise, it is not our intention to limit the scope of this invention to any particular embodiment herein discussed.

This invention also contemplates circulating a primary heat exchange fluid through the double pipe heat exhanger and utilizing, in an energy extracting means, the heat energy thereby recovered. Specifically, it is contemplated to utilize the heat energy in an electricity generating means, such as by generating steam to turn a steam turbine and its electrical generator.

Figure 6:
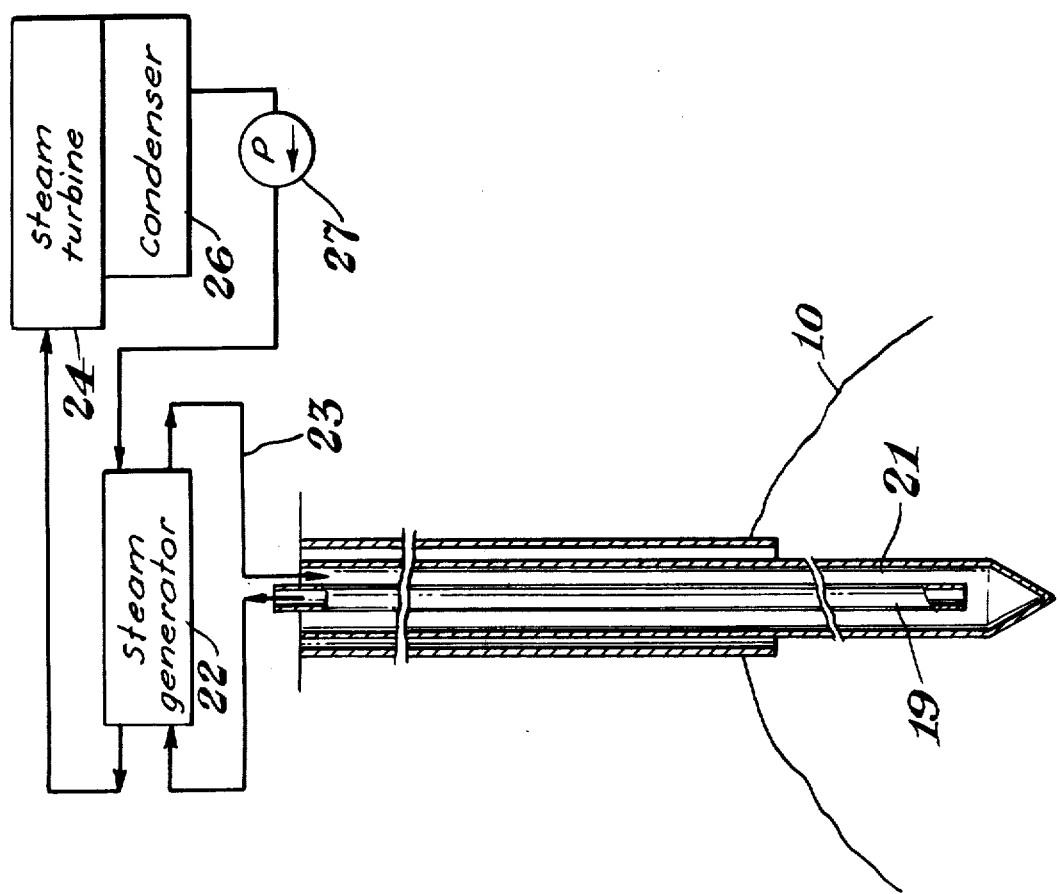
FIG. 6 is a schematic view illustrating one embodiment of a geothermal electrical generation system of the invention which utilizes two closed heat exchange fluid loops.

FIG. 6 illustrates one embodiment of a typical geothermal power system as contemplated in accordance with the present invention. The primary heat exchange fluid can descend the annulus 21 of the double pipe heat exchanger. Once heated, the primary fluid will rise through the insulated inner pipe 19 of the double pipe heat exchanger. The heated fluid is passed through steam generator 22 after which it is returned via conduit 23 to the well head, where it will be recirculated through the double pipe heat exchanger, thus forming a primary circulating loop.

As further illustrated in FIG. 6, steam generator 22 can be operationally connected to a secondary circulatory loop. Water circulating within the loop is converted to steam by generator 22. The steam passes to a powers steam turbine 24 which drives a generator (not shown) thus producing electrical energy. Through the use of a condenser unit 26 and a feed pump means 27 water can be recirculated from the steam turbine to the steam generator and on through the secondary circulating loop. It is understood that the fluid employed in the secondary circulating loop is not restricted to water but any suitable substance such as isobutane could be utilized should any advantage ensue. Steam is used generically in this paragraph to refer to the vapor of any such fluid.

This invention also contemplates that the change in density between the comparatively cold descending fraction of the primary heat exchange fluid and the heated fluid fraction will provide a natural driving force that will serve to circulate the fluid through the primary circulating loop. This facilitates the operation of the heat transfer system described above by minimizing pump requirements or even eliminating the need for any pump means for propelling the primary fluid through the well.

It is understood that there are various alternative methods that can be employed within the scope of the present invention to generate electricity by utilizing the heat energy contained within the primary heat exchange fluid. The system illustrated in FIG. 6 is but examplary of such methods.

As discussed previously, it is contemplated that the primary heat exchange fluid will form a natural circulation loop within the double pipe heat exchanger. This invention, therefore, also contemplates utilizing, in a geothermal hydrodynamic system of producing electrical energy separate the distinct from the heat transfer system discussed above, the kinetic energy of the fluid ascending in the double pipe heat exchanger.

Figure 7:
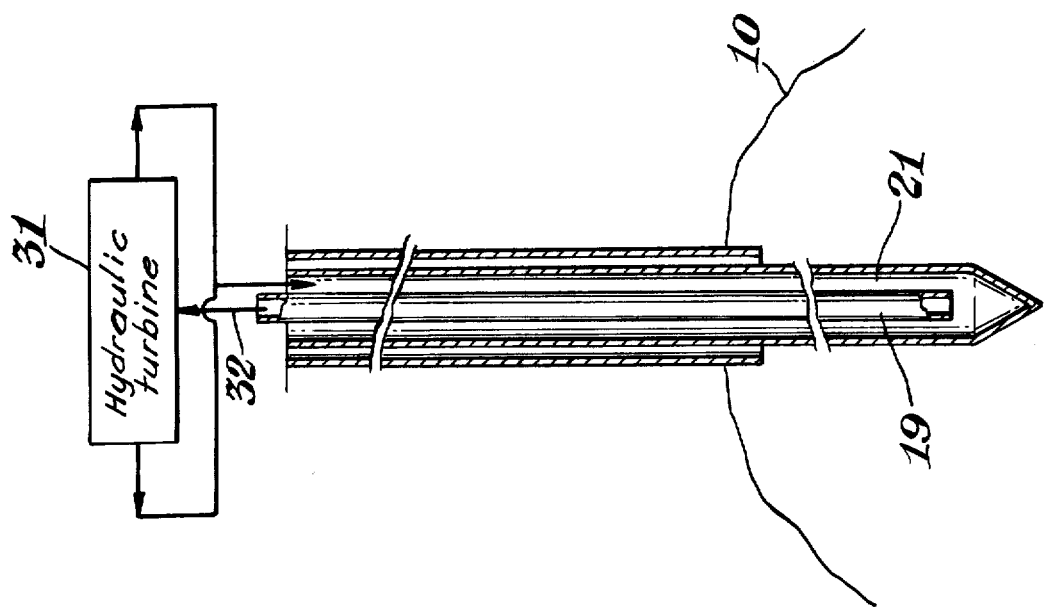
FIG. 7 is a schematic view illustrating another embodiment of a geothermal system of the invention in which electricity is generated by hydroelectrical means.

FIG. 7 illustrates one embodiment of such a system. The fluid ascending from well 11 can be transported directly, after it leaves the well, to a suitable hydraulic turbine 31 via conduit 32. The hydraulic turbine 31 is preferably contained within a suitable pressure vessel (not shown).

It is understood that there are a number of alternative methods by which the kinetic energy of the moving fluid can be converted into electricity or other useful energy forms. For example, if the moving fluid is an electrical conductor, it can also be circulated through an electromagnetic generator and electrical energy can be thereby produced.

A suitable primary fluid utilized in the heat transfer system of the invention will be chosen according to the needs of the individual practicer of this invention. Criteria to be considered include its heat transfer properties and its compatibility with the primary system materials. However, because the primary fluid is self-contained and is therefore not exposed to the underground environment, a wide variety of primary fluids can be employed in such a manner as to optimize the system's energy output. It is understood, therefore, that the present invention is not dependent upon the particular choice of any primary fluid used therein.

The fluid selected for use within this invention's geothermal hydrodynamic energy system should be chosen so that, in order to maximize the amount of usable kinetic energy, it is a liquid, not necessarily water, near its critical point at the temperatures realized within the double pipe heat exchanger. Choice of the fluid is thus dependent upon the temperature achieved by the individual well.

The present invention's geothermal hydrodynamic system may utilize salt that has temperatures (i.e., below about 350° F) at which the operation of the heat transfer system discussed above would be uneconomical. Although operation at such low temperatures would not improve a low Carnot efficiency, it would extend resources and their useful lifetime.

Locations of rock salt formations that can be suitably employed in the present invention are known. Moreover, methods of prospecting for other suitable rock salt formations are well developed in the art.

The rock salt formations utilized in the present invention will possess three basic characteristics. First, the depth at which the salt becomes sufficiently plastic (so that the weighted outer pipe of the double pipe heat exchanger will sink to the bottom of the diapir) will be well within reach of modern bore hole drilling equipment. Second, a sufficient operating temperature to maintain the geothermal energy system discussed herein will be reached in that area of the formation that is in contact with the double pipe heat exchanger. Third, the formation will be sufficiently deep and large so that well can provide economically large amounts of heat transfer surface, i.e., the lateral surface area of the well in contact with the salt.

In order to reach such operating temperatures it may be necessary to drill into deep (i.e., where the distance from the peak of the dome to the surface is greater than 10,000 feet) or at least intermediate (where the above distance is from 4,000 to 10,000 feet) salt domes. However, the distance from the peak of the salt dome to the surface is not the only parameter that will be considered when choosing a suitable salt dome for the purposes of this invention. Other parameters that should be considered are the thickness of the overburden on the diapir, the salt temperature desired, and the ratio of the thermal conductivity of the overburden to that of the rock salt.

The ratio of the thermal conductivity of the overburden to that of the rock salt is inversely related to the insulating properties of the overburden. A typical value for this ratio is between 0.2 and 0.3. When the overburden is composed of anhydrite caprock, however, this ratio is about 0.05, which is indicative of the excellent insulation properties that anhydrite caprock possesses. Therefore, the drilling distance to reach plastic rock salt should be greatly reduced when the dome is insulated by a thick (500 feet or more) anhydrite caprock.

Well 11 can be drilled entirely by conventional bore hole drilling techniques. In the alternative, such techniques may be employed to drill through the overburden and caprock and, once the salt is reached, solution mining techniques may be utilized to continue drilling the well hole to a depth at which operating temperatures are reached within the salt domes.

The heat flux, i.e. the rate of heat transfer from the salt into the primary fluid, for the long, thin cylindrical wells with which this invention will be practiced can be readily calculated by using the formula:

$$q = \frac{Bk\Delta T}{R_o} \cdot \frac{1}{\left[\ln \frac{k\theta}{E} + BC(1 + \log_2 R_o)\right]}$$

wherein $q$ is the heat flux through the outer wall of the double pipe heat exchanger in Btu/hr ft², $B$ and $C$ are dimensionless constants equaling, respectively, 1.90 and 0.70, $k$ is the value of the thermal conductivity of the salt in Btu/hr ft° F, $\Delta T$ is the temperature difference, in ° F, available for heat transfer across the salt or, otherwise stated the temperature differential between the primary fluid and the salt, $R_o$ is the radius of the double pipe heat exchanger, $\theta$ is the length of time, in years, for which the heat exchange system is to operate at a constant heat flux $q$, and $E$ is a constant equaling $3.26 \times 10^{-4}$ yr Btu/hr ft ° F.

It is understood that the practitioner of this invention will choose to sink the closed end pipe 15 to a depth at which the temperature of the rock salt is such that it will provide an energy output which is optimum in accordance with the individual needs of the practitioner.

The heat flux discussed above will decrease quite slowly. We have calculated that the heat flux will decrease as the $-1/10$ power of time. For example, a geothermal system in accordance with the present invention that was designed to produce 10 MWt for 12.5 years will produce approximately 7.5 MWt between its 100th and 200th years.

What is claimed is:

1. A method of extracting geothermal energy comprising the steps of:
   a. drilling and casing a well into a rock salt formation to a depth at which the rock salt behaves plastically;
   b. inserting a closed end pipe into the well said pipe being filled with removable weighted material;
   c. sinking the pipe in the plastic salt to a depth at which the calculated energy output is of a selected value;
   d. inserting an insulated pipe within the sunken closed end pipe, said closed end pipe and said insulated pipe thus forming, in combination, a double pipe heat exchanger;
   e. circulating a heat exchange fluid through both the double pipe heat exchanger and through an energy extracting means; and
   f. recovering energy from the heat exchange fluid.

2. The method of claim 1 wherein, intermediate steps (c) and (d), some of or all of said weighted material is removed from said closed pipe end.

3. The method of claim 1 wherein the weighted material has a density greater than the density of the plastic salt.

4. The method of claim 1 wherein said energy generating means is an electrical energy generator.

5. The method of claim 4 wherein said generator is powered by heat energy from the heat exchange fluid.

6. The method of claim 4 wherein said generator is powered by kinetic energy from the heat exchange fluid.

* * * * *